United States Patent
Pollock

Patent Number: 6,060,667
Date of Patent: May 9, 2000

[54] METHOD AND APPARATUS FOR SUPPLYING PREDEFINED QUANTITIES OF BULK MATERIAL

[76] Inventor: John Pollock, 24432 Pressonville Rd., Wellsville, Kans. 66092

[21] Appl. No.: 09/046,816

[22] Filed: Mar. 24, 1998

[51] Int. Cl.$^7$ .......................... G01G 13/04; G01G 23/02; G01G 13/00
[52] U.S. Cl. .............................. 177/121; 177/154; 222/77
[58] Field of Search ........................ 177/120, 121, 177/122, 123, 184, 189, 154, 156; 222/77, 55, 56

[56] References Cited

U.S. PATENT DOCUMENTS

| | | | |
|---|---|---|---|
| 3,893,492 | 7/1975 | Nohren | 141/1 |
| 4,111,336 | 9/1978 | Ward et al. | 222/58 |
| 4,301,510 | 11/1981 | Ricciardi et al. | 177/25.11 |
| 4,570,419 | 2/1986 | Tinsley | 53/474 |
| 4,576,243 | 3/1986 | Matsumoto | 177/119 |
| 4,579,252 | 4/1986 | Wilson et al. | 222/55 |
| 4,595,125 | 6/1986 | Alwerud | 177/121 |
| 4,733,971 | 3/1988 | Pratt | 141/83 |
| 4,819,700 | 4/1989 | Sommer et al. | 141/1 |
| 4,830,508 | 5/1989 | Higuchi et al. | 222/56 |
| 4,852,028 | 7/1989 | Korpela et al. | 222/77 |
| 4,883,390 | 11/1989 | Reintjes et al. | 406/24 |
| 4,890,535 | 1/1990 | Bieber | 83/31 |
| 4,938,385 | 7/1990 | Hayashi | 222/55 |
| 4,944,428 | 7/1990 | Gmur et al. | 222/55 |
| 5,024,352 | 6/1991 | Gmur et al. | 222/1 |
| 5,103,401 | 4/1992 | Johnson | 222/56 |
| 5,285,930 | 2/1994 | Nielson | 177/121 |
| 5,430,532 | 7/1995 | Ueda et al. | 355/260 |
| 5,595,482 | 1/1997 | Parsons | 432/95 |
| 5,639,995 | 6/1997 | Mosher | 177/122 |
| 5,767,455 | 6/1998 | Mosher | 177/121 |

*Primary Examiner*—Randy W. Gibson
*Attorney, Agent, or Firm*—Chase & Yakimo, L.C.

[57] ABSTRACT

A method and apparatus is disclosed for supplying a predefined quantity of bulk material to a packaging system. An amount of bulk material which closely approximates the desired package weight is discharged from a surge bin into a loss-in-weight feeder. Accurate single package weight loading of the loss-in-weight feeder yields a lower percentage of weight variance during feeder discharge than more heavily loaded feeders. In addition, the apparatus includes weight bearing springs mounted within the weighing mechanisms of the loss-in-weight feeder such that the weighing mechanisms are not damaged by overloading. The method of accurate filling of the loss-in-weight feeder prior to discharge and the spring protected loss-in-weight feeder cause package portions having optimal weight variance to be supplied for packaging.

14 Claims, 11 Drawing Sheets

METHOD AND APPARATUS FOR SUPPLYING PREDEFINED QUANTITIES OF BULK MATERIAL

BACKGROUND OF THE INVENTION

This invention relates to a method and apparatus for supplying predefined quantities of bulk material to a packaging system and, more particularly, a multi-stage process of weighing and discharging bulk materials which provides improved accuracy of final product weight.

Several methods and devices for automatically filling shipping packages with bulk materials are practiced in the industry. A significant problem with automatic filling methods, however, is obtaining accurately weighted portions of bulk material to be packaged. Various methods and devices relative to this problem have been proposed in the prior art which vary the discharge rates of loss-in-weight feeders by comparing actual discharge rates with a desired discharge rate. Another method, disclosed in U.S. Pat. No. 5,466,894 to Naef, proposes differential weighing of a quantity of material prior to discharging the material for packaging.

Although assumably effective in operation, such known devices and methods fail to account for weight variances introduced when a loss-in-weight feeder is filled with a weight of bulk material that is significantly heavier than the desired package weight. Further, loss-in-weight feeders presently do not protect sensitive weighing mechanisms from damage caused by overloading so as to ensure weighing accuracy. Thus, it is desirable to have a process for weighing and delivering an amount of bulk material to a loss-in-weight feeder which closely approaches the desired package weight prior to utilizing the feeder which then supplies an extremely accurate portion for packaging. It is also desirable to deliver a generally accurate package amount of material to the feeder so as to protect the sensitive weighing mechanisms from damage.

SUMMARY OF THE INVENTION

In response thereto, I have invented a multi-stage process of weighing bulk materials in order to deliver a relatively accurate amount of material to a loss-in-weight feeder so as to prepare a more accurate package portion. In conjunction therewith, I have invented an apparatus which provides long-term accurate portion preparation by protecting the weighing mechanisms from damage caused by overloading.

A loss-in-weight feeder is known in the art as a device which receives bulk material into a weighing hopper and then discharges the material from the hopper at a controlled rate. A loss-in-weight feeder functions within a range of accuracy; that is, a loss-in-weight feeder is able to deliver a portion of material having a certain variance, e.g. 0.25%, of the desired weight. Within the range of accuracy, it has been discovered that the variance from the desired weight bears a direct relationship to the total weight of material contained within the feeder hopper during the discharge operation. For example, the percentage of weight variance is greater when feeding from a hopper containing 100 pounds of material than when feeding from a hopper containing 30 pounds of materials. The significant difference in density between a heavy load of bulk material and a lighter load or between an initially heavy load which becomes lighter during discharge contributes to this relationship. Accordingly, it is advantageous to fill the loss-in-weight feeder hopper with the least possible amount of material that is required to fill a package. The loss-in-weight feeder is then able to repetitively perform at optimal rates of percentage accuracy.

Accurate preparation of package portions is also improved through the placement of springs in the mounting means of the weighing mechanisms. The springs will not deform to absorb the weight of a normal load, but rather will only deform under the weight of a load sufficiently heavy to damage the weighing mechanisms. Preventing unnecessary or unintentional stress upon the weighing mechanisms provides for long-term weighing accuracy of the loss-in-weight feeder.

Therefore, a surge bin rapidly delivers bulk material to the loss-in-weight feeder hopper until the weight of the hopper reaches a predefined package weight. Although a certain amount of after-flow may occur following suspension of the high-speed transfer, a relatively accurate package weight is then available for operation of the loss-in-weight feeder. The weighing mechanisms are protected against damage caused by an overloading of the hopper by a spring arrangement. Bulk material having minimal weight variance is then discharged by the loss-in-weight feeder onto a conveyor for delivery to a packaging system.

Alternatively, material from the surge bin may be transferred to one or more intermediate transfer bins for weighing and separation prior to delivery to a loss-in-weight feeder. This multi-stage weighing and delivery process further improves the accuracy of the weight of the bulk material received by the loss-in-weight feeder.

It is therefore a general object of this invention to provide a method and apparatus for supplying predefined quantities of bulk material for packaging.

Another object of this invention is to provide a method and apparatus, as aforesaid, having a primary surge bin which delivers bulk material to a loss-in-weight feeder hopper.

Still another object of this invention is to provide a method and apparatus, as aforesaid, which senses when a relatively accurate package weight of material has been received into a loss-in-weight feeder hopper and signals the surge bin to disengage.

Yet another object of this invention is to provide a method and apparatus, as aforesaid, which delivers an accurate package weight portion of particulate material to a conveyor for transfer to a packaging system.

A further object of this invention is to provide a method and apparatus, as aforesaid, having a conveyor movable at variable speeds for receiving a material portion from a loss-in-weight feeder and transferring the portion to a packaging system.

Another object of this invention is to provide a method and apparatus, as aforesaid, which coordinates the rate of delivery from the loss-in-weight feeder to the rate of speed of the conveyor to assure a desired dispersion of the particulate material thereon for effective delivery to a downstream packaging system.

A still further object of this invention is to provide a method and apparatus, as aforesaid, which minimizes final product weight variances through a multi-stage weighing process.

A particular object of this invention is to provide a method and apparatus, as aforesaid, which economically protects the weighing mechanisms from damage caused by weight overload.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Turning more particularly to the drawings, FIGS. 1–4 show the scale system apparatus generally comprising a frame 100 having a loss-in-weight feeder 200 and control unit 300 fixedly attached thereto. The frame 100 includes upper front 110 and rear 112 strut members with oppositely disposed upper side strut members 114 integrally attached therebetween. Upper strut members 110, 112, 114 are integrally joined to legs 116 at the junctures of said upper members 110, 112, 114. The frame 100 further includes lower front 120 and rear 122 strut members with oppositely disposed lower side struts 124 positioned therebetween, said lower strut members 120, 122, 124 being integrally joined to legs 116 as described earlier. An intermediate strut member 126 is displaced from the upper front strut member 110 and integrally attached to upper side strut members 114.

The loss-in-weight feeder 200, the general construction of which is known in the art, includes a hopper 210 for receiving bulk material to be processed by the feeder. A lip/flange 214 is normal to the upper ends of the walls of the hopper 210 and presents spaced apart apertures 216 therethrough. The hopper 210 includes a bottom wall 212 having a gap (not shown) at one end through which bulk particulate material is discharged during feeder operation.

Figure 6:
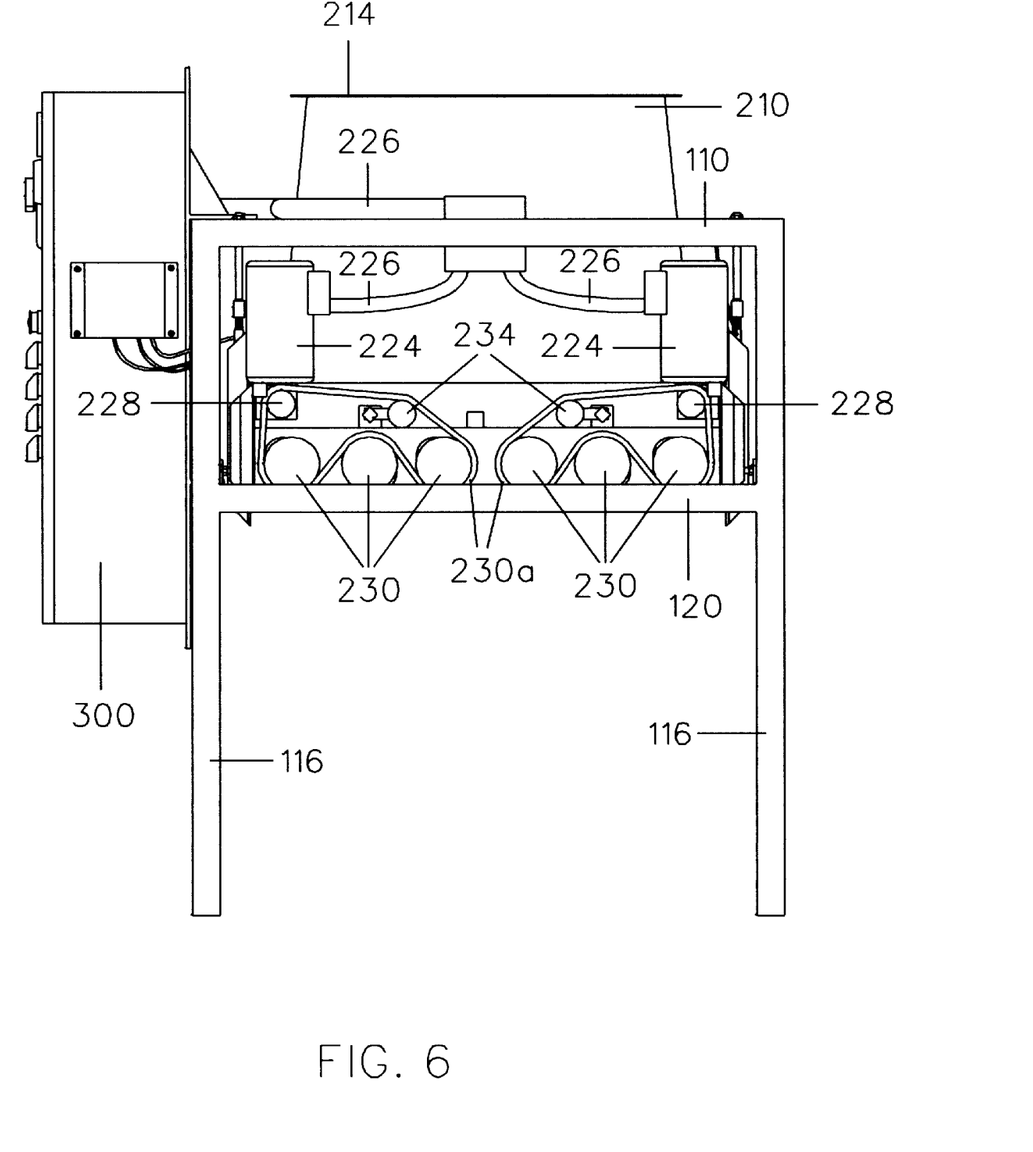
FIG. 6 is a front view of the scale system apparatus.

The loss-in-weight feeder 200 further includes a plurality of augers 220 (FIG. 4) for discharging bulk material from the hopper 210 at a controlled rate, the controlled rate decreasing as the discharge approaches the desired amount of package weight of the particulate material. Each auger 220 is fixedly attached to a rotatably mounted shaft 222. As more particularly shown in FIGS. 4 and 6, the augers 220 are powered by a pair of electric motors 224 which receive electricity from the control unit 300 through insulated wires 226. Activation of the motors 224 initiates rotation of a first pair of sprockets 228 which in turn rotate serpentine chains 230a in contact with sprockets 230 fixedly attached to the auger shafts 222 (FIG. 6). The serpentine chains 230a maintain consistent contact with the sprockets 228, 230 through contact with a tension mechanism 234.

The loss-in-weight feeder 200 further includes side 260 (FIG. 9) and rear 280 (FIG. 8) load point assemblies for sensing the weight of the hopper 210, said assemblies being known in the art. Each assembly 260, 280 comprises upper 240 and lower 242 clevis blocks having rods 246 inwardly extending therefrom and integrally connected to a load cell 244 sandwiched therebetween. Upper 240 and lower 242 clevis blocks further include oppositely extending upper 248 and lower 250 rods, respectively, for fixedly mounting the assemblies.

Figure 1:
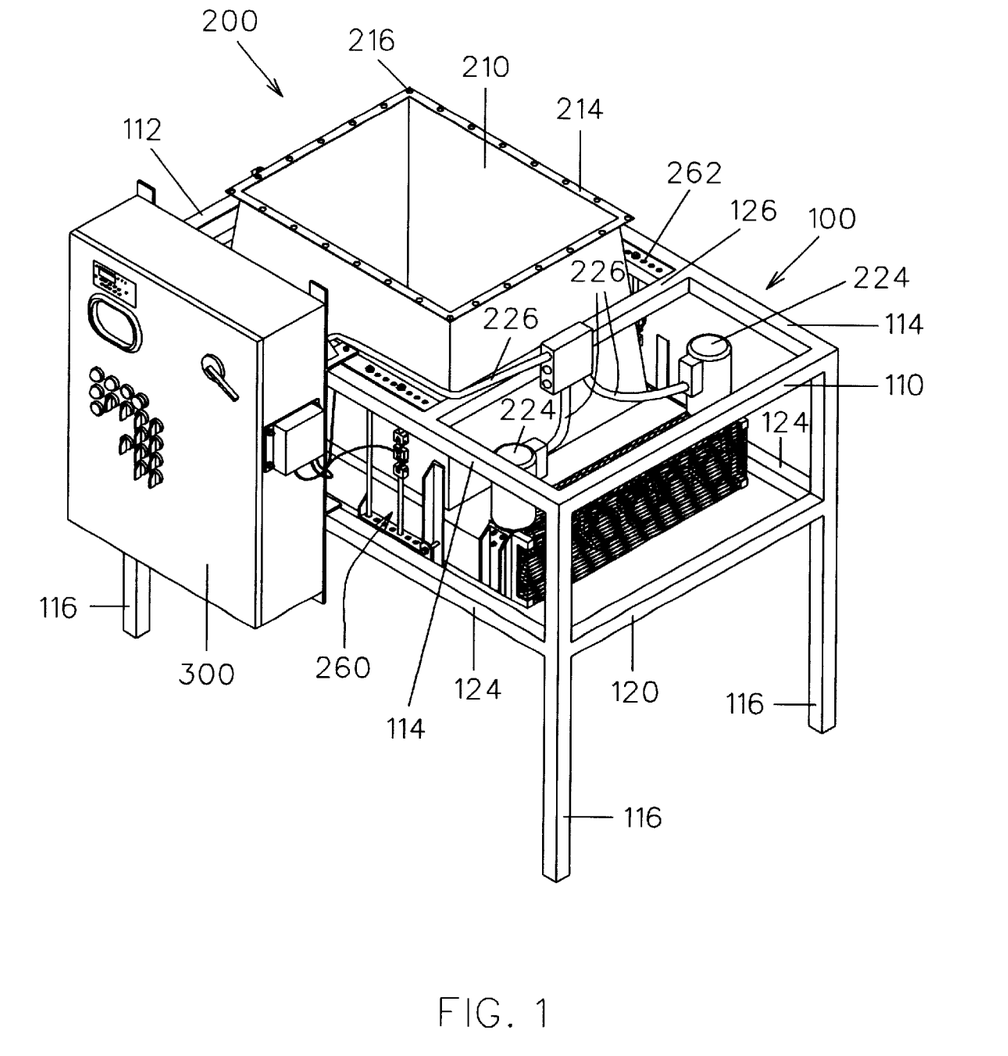
FIG. 1 is a front perspective view of the scale system apparatus.
Figure 2:
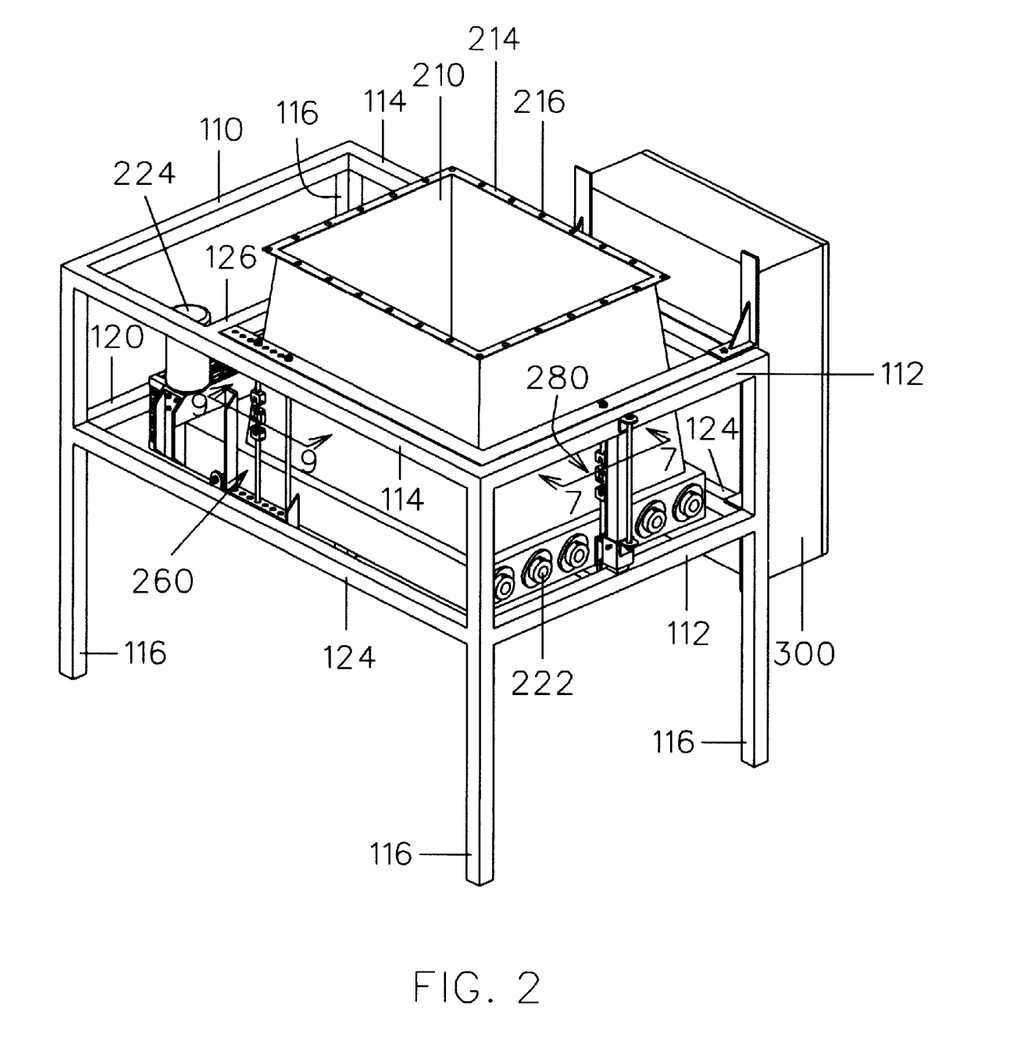
FIG. 2 is rear perspective view of the scale system apparatus.
Figure 3:
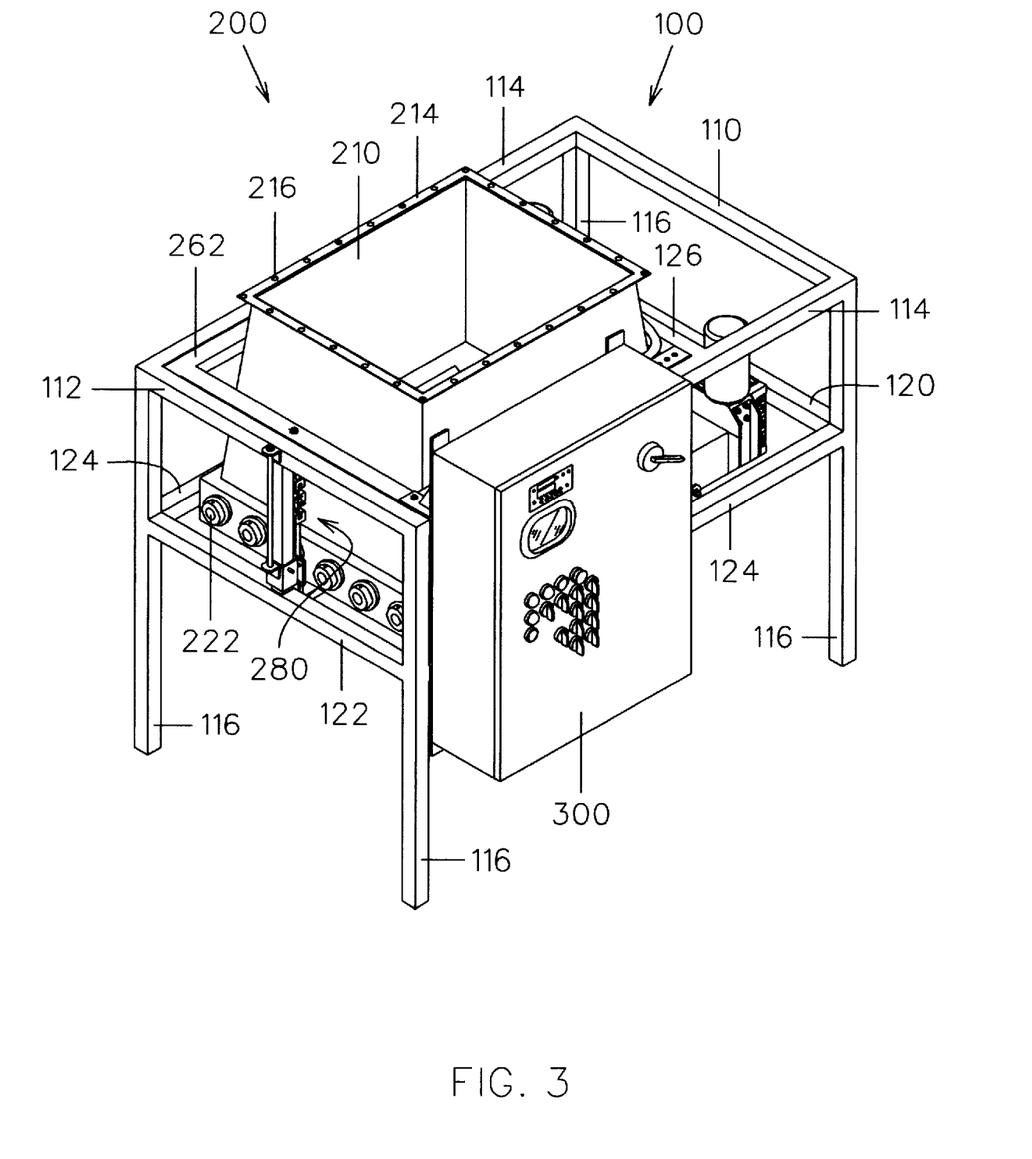
FIG. 3 is a rear perspective view of the scale system apparatus.
Figure 4:
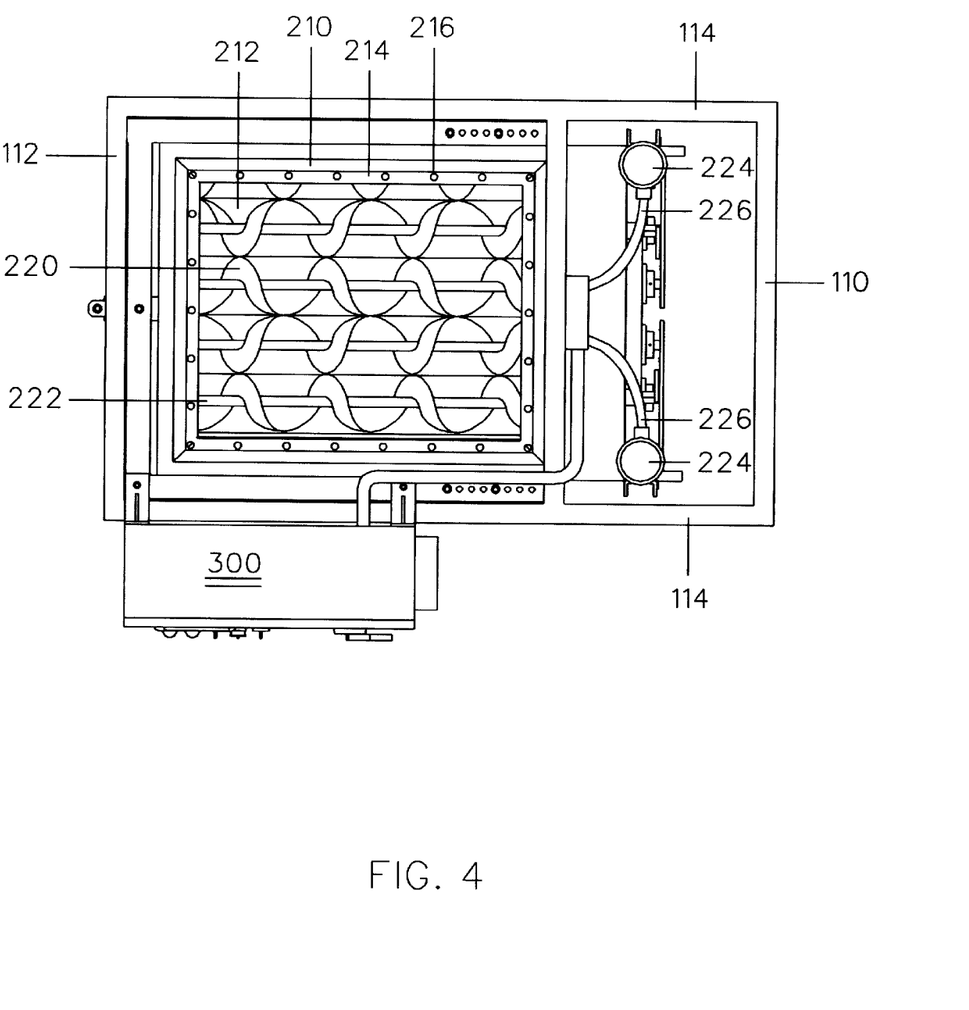
FIG. 4 is a top view of the scale system apparatus.
Figure 5:
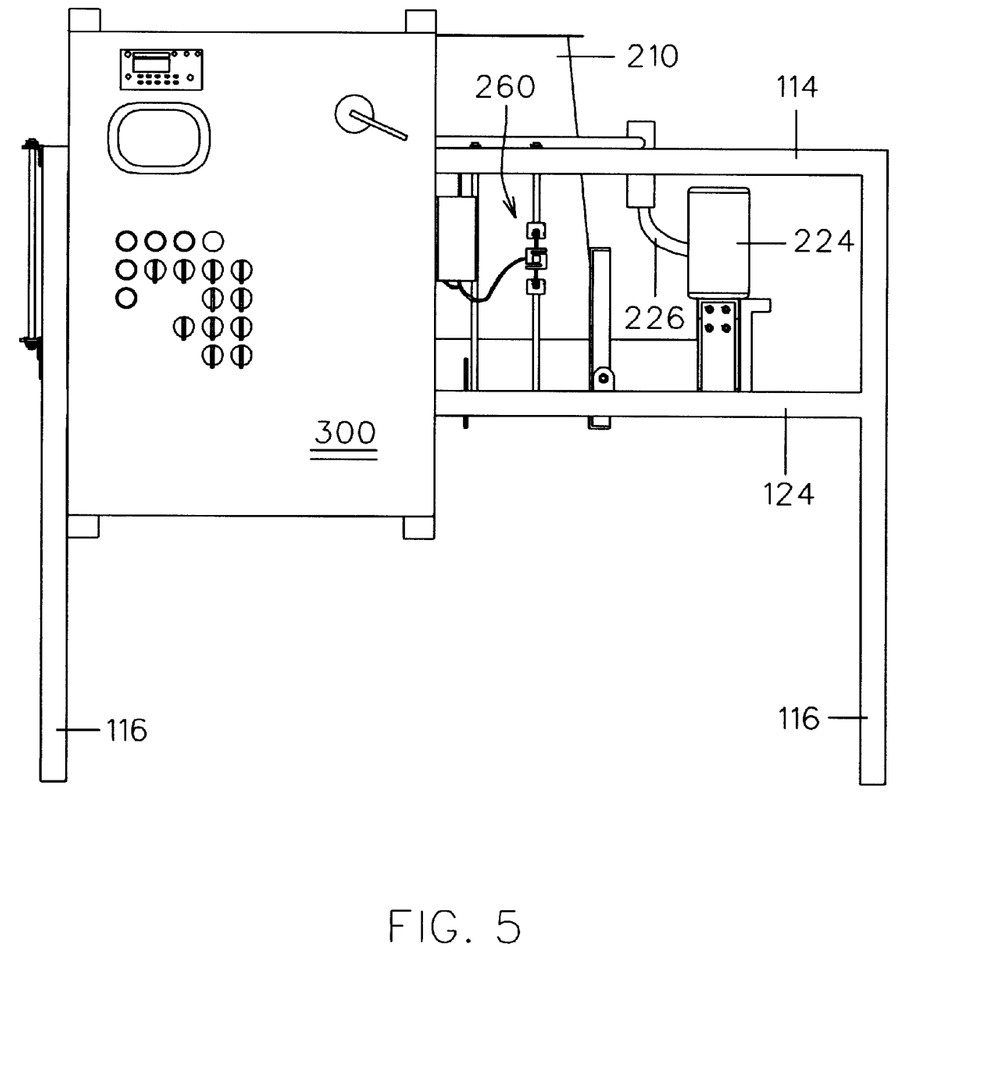
FIG. 5 is a side view of the scale system apparatus.
Figure 9:
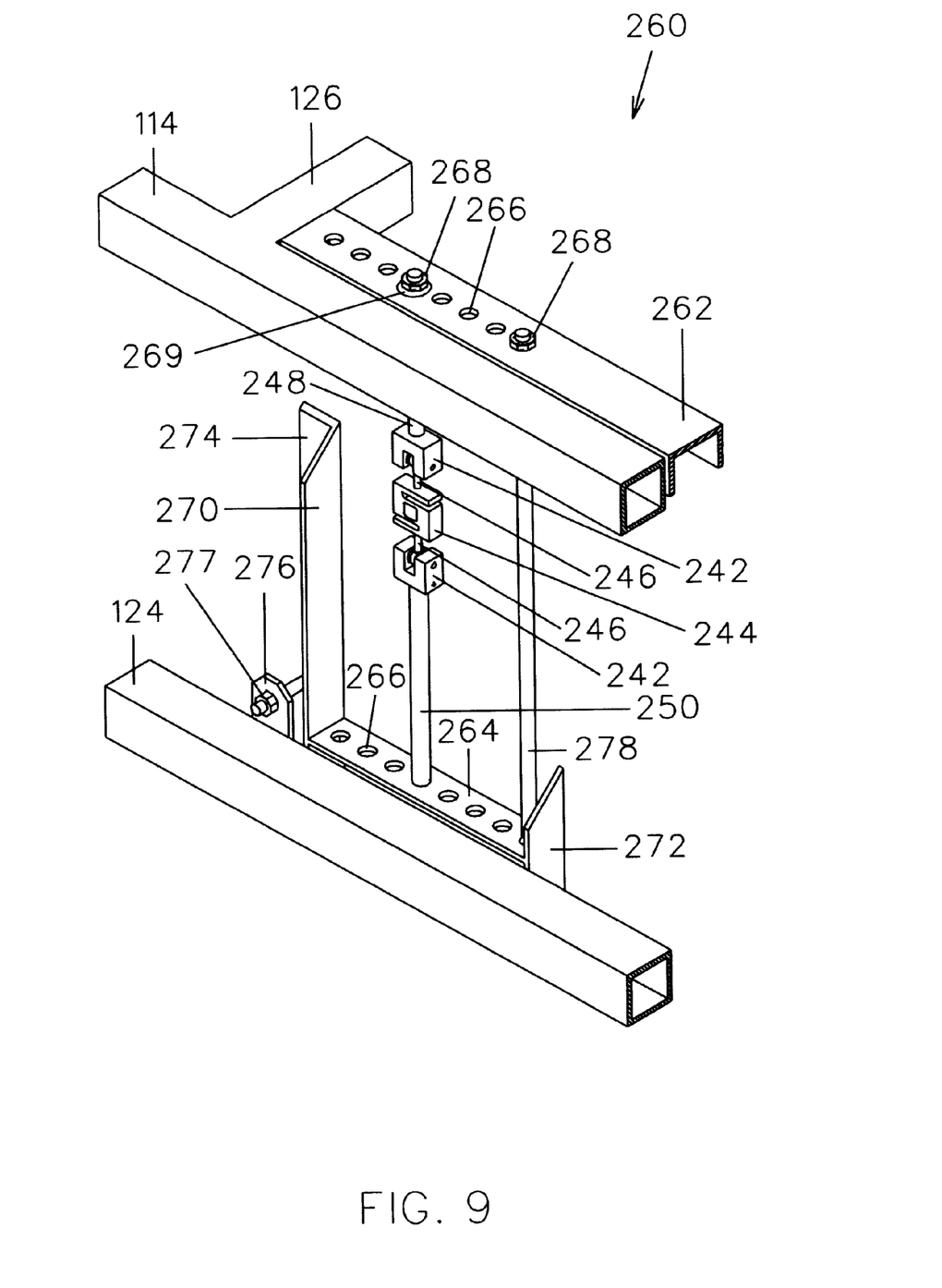
FIG. 9 is an enlarged sectional view of the scale system apparatus taken along line 9—9 in FIG. 2.

As shown in FIGS. 3 and 9, each side load point assembly 260 includes upper 262 and lower 264 flanges which present a plurality of apertures 266 for receiving upper 248 and lower 250 mounting rods therethrough, respectively, said rods 248, 250 being secured thereto with nuts 268. The upper flange 262 extends about the interior of the upper side 114 and rear 112 frame members and is fixedly attached thereto, the upper flange 262 terminating at opposing ends of the intermediate upper frame member 126. The lower flange 264 includes oppositely disposed upstanding first 270 and second 272 arms integrally attached thereto. An outwardly extending flange/arm 274 is normal to the first arm 270 for securing the lower flange 264 to a tab/flange 276 with a nut-bolt arrangement 277, the tab/flange 276 being fixedly attached to a lower side member 124. The lower flange 264 and arms 270, 272 are fixedly attached to the hopper 210. An elongated rod 278 is secured to each upper 262 and lower 264 flange with nuts 268 for preventing over-extension of each side load point assembly 260.

Figure 7:
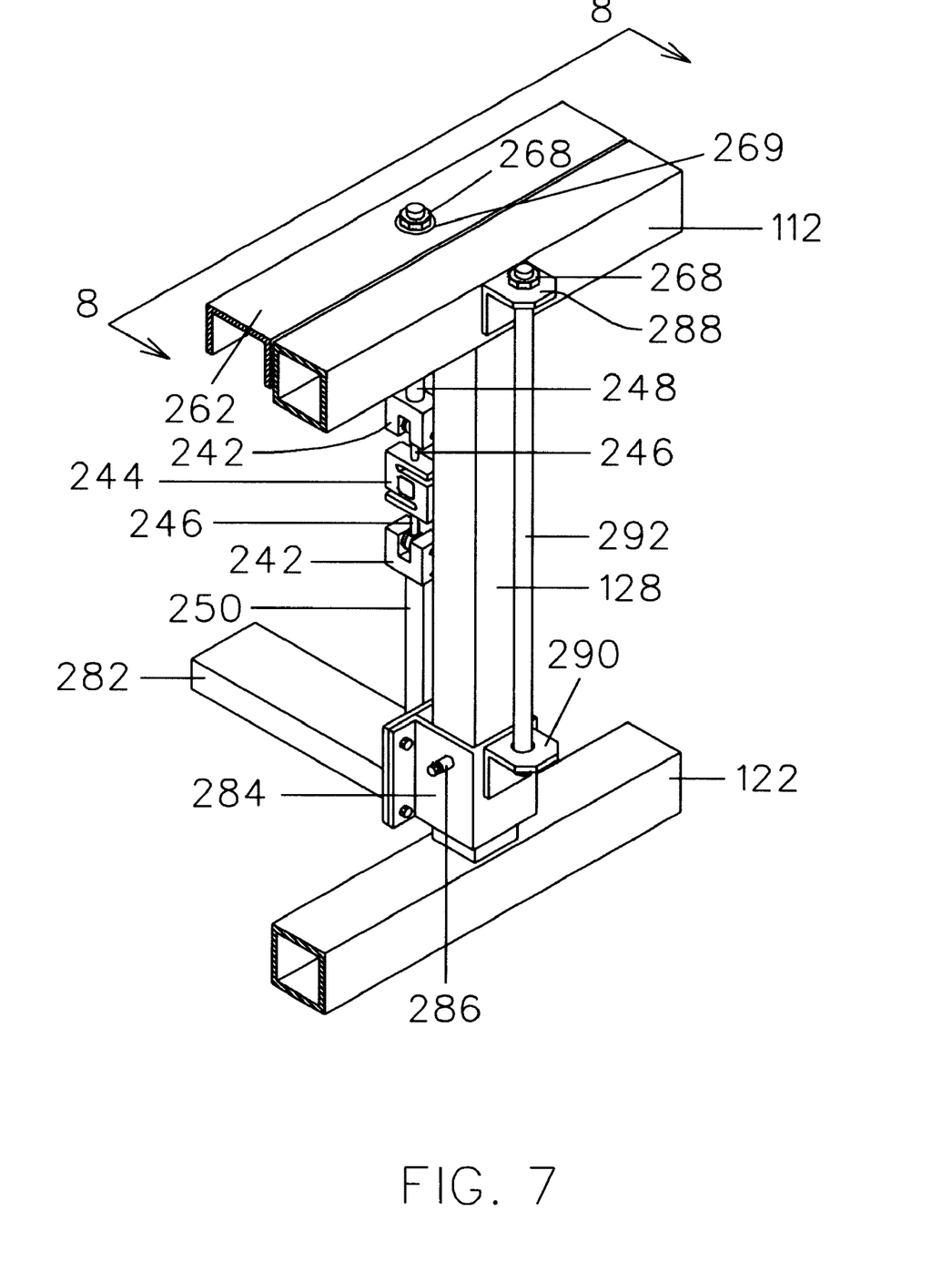
FIG. 7 is an enlarged sectional view of the scale system apparatus taken along line 7—7 in FIG. 2.
Figure 8:
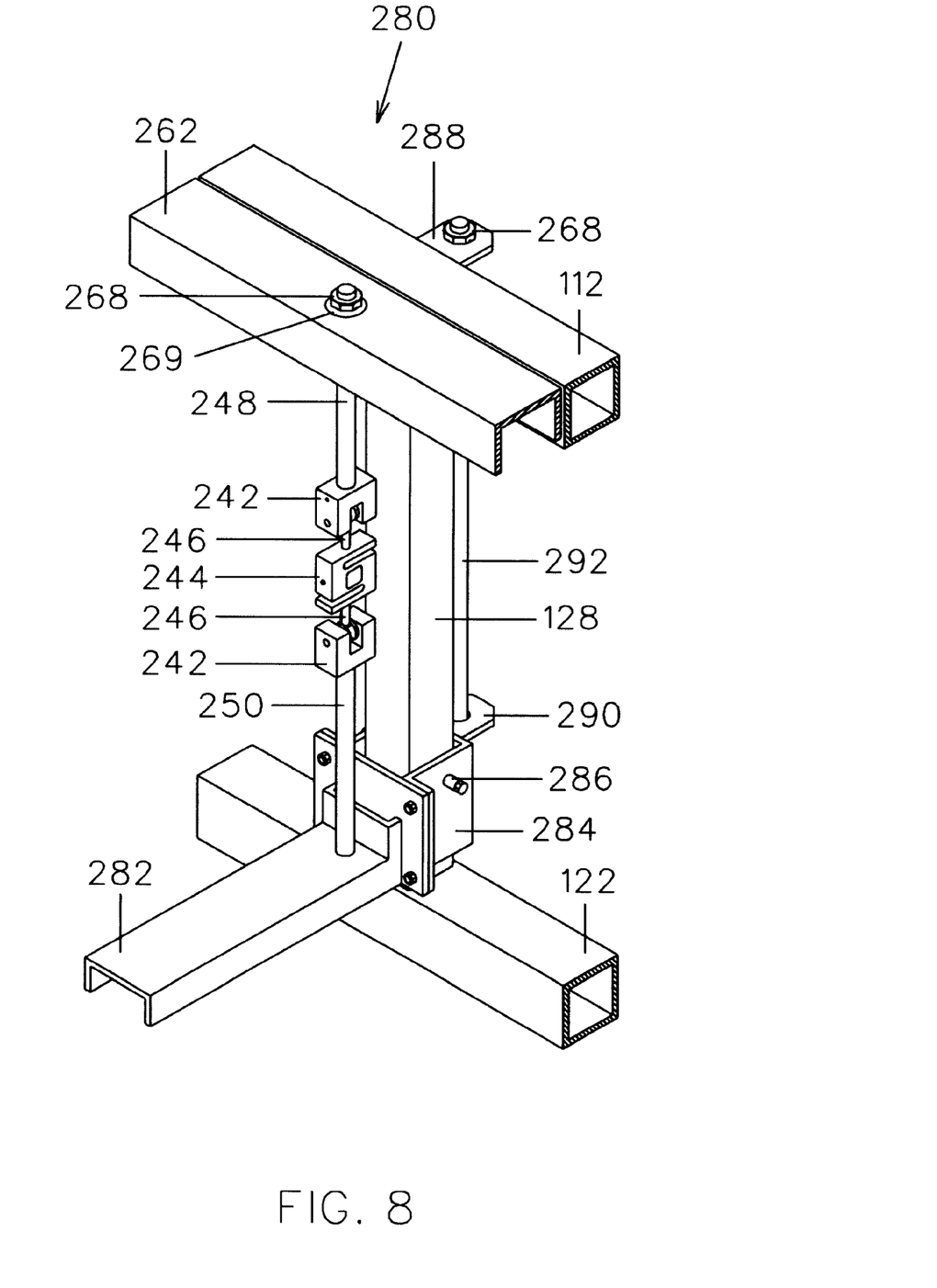
FIG. 8 is a perspective view of the scale system apparatus taken along line 8—8 in FIG. 7.

In the rear load point assembly 280, the upper mounting rod 248 is insertably joined to the upper flange 262 and secured thereto with a nut 268 (FIGS. 7–8). The lower mounting rod 250 is fixedly attached to a lower bracket 282, the lower bracket 282 being fixedly joined to the bottom wall 212 of the hopper 210. The lower bracket 282 is fixedly attached to a second bracket 284 slidably mounted about an upstanding frame member 128 for stabilizing the assembly 280 during a weighing operation. A pin 286 is insertably joined to the second bracket 284 for increasing stability during weighing. An elongated rod 292 is insertably joined to upper 288 and lower 290 tabs/flanges and secured thereto with nuts 268, said tabs/flanges being fixedly attached to the upper rear frame member 112 and second bracket 284, respectively. The elongated rod 292 protects the rear assembly 280 from damage as described above.

The load point assemblies 260, 280 further include load bearing springs 269 sandwiched between the upper flange 262 and nut 268 which secures the upper mounting rod 248 thereto. Disc springs are preferable as they are economical, easy to install, and only deform under very high weight loads. Thus, the disc springs 269 act as dampeners to prevent damage to the load point assemblies if the hopper 210 is overloaded, yet will not cause faulty weight measurements under normal weight conditions particularly in the method of particulate discharge as to be described.

Figure 10:
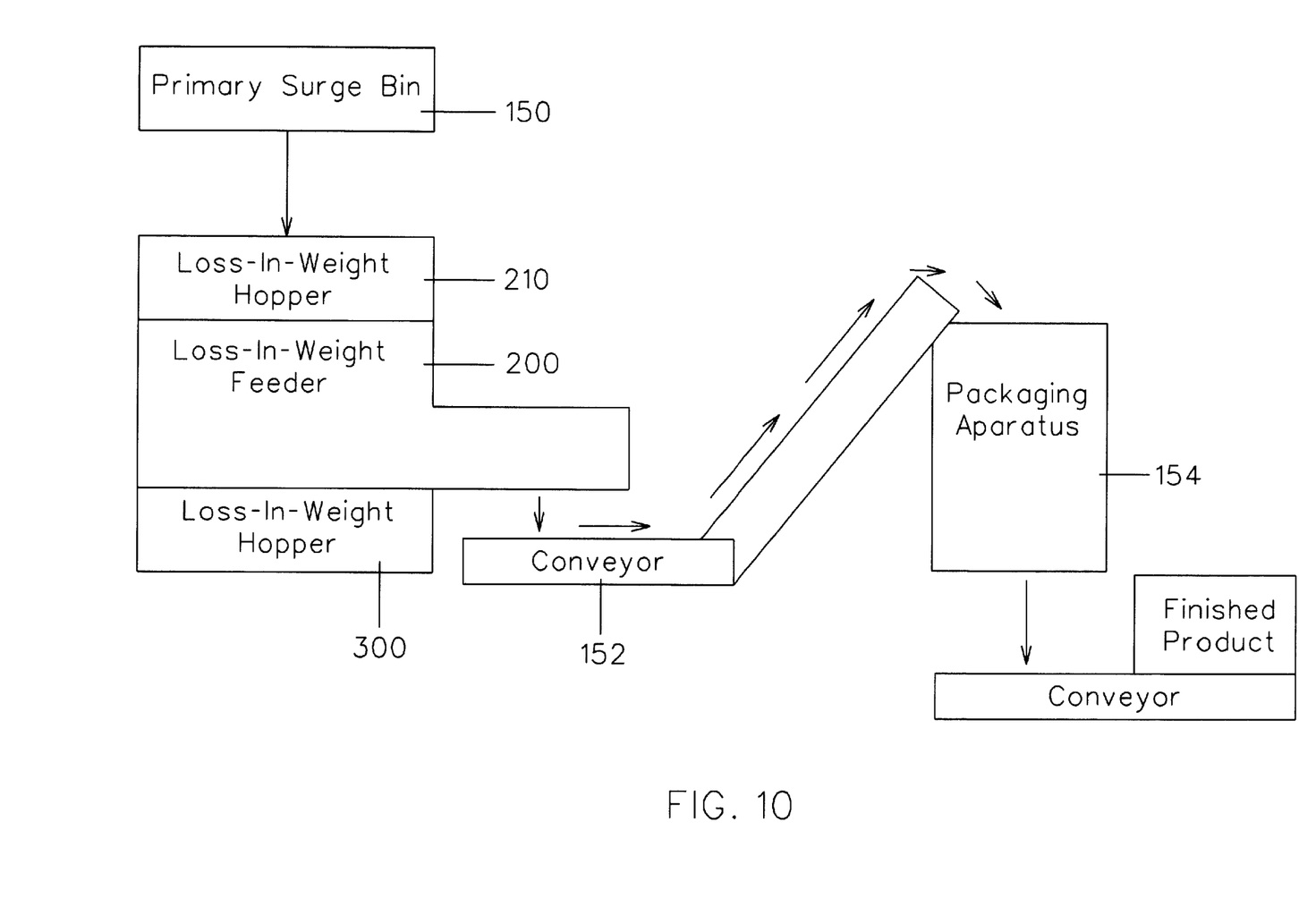
FIG. 10 is a diagrammatic view of the method and apparatus of the invention.
Figure 11:
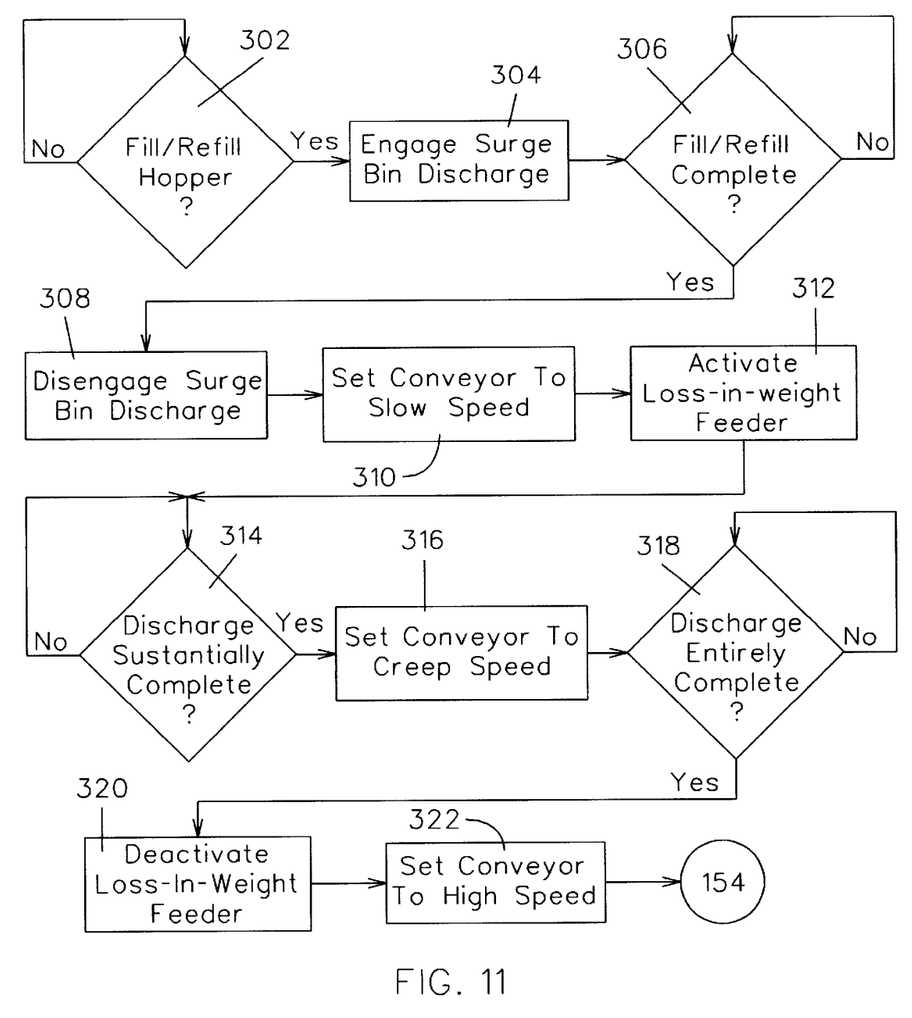
FIG. 11 is a flow chart showing the program steps executed by the control unit of FIG. 1.

The apparatus described above is utilized within the methodology illustrated in FIGS. 10–11. FIG. 10 generally shows a primary surge bin 150 from which a predetermined amount of particulate material is discharged into a loss-in-weight feeder hopper 210. A package portion of material is discharged from the loss-in-weight feeder 200 onto a conveyor 152 which delivers the material to a packaging apparatus 154.

As shown in FIG. 11, the loss-in-weight feeder 200, in communication with the control unit 300, continuously senses whether a discharge cycle has been completed 302. Upon cycle completion, the control unit 300 activates discharge 304 from the surge bin 150 to discharge material into the hopper 210. If the discharge is in bulk, the above-described disc springs dampen the effect of the load thereon so as to diminish the effect of the load on the function of the feeder. The loss-in-weight feeder 200, acting as a scale system, continuously senses 306 whether a predetermined package weight of material has been discharged into the hopper 210, the control unit 300 disengaging the surge bin discharge mechanism upon satisfaction of this condition 308. The control unit 300 simultaneously activates 310, 312 the conveyor 152 and loss-in-weight feeder 200 such that the conveyor receives material discharged from the feeder at a controlled rate. When a predetermined amount of material less than the total desired amount has been discharged 314, the conveyor 152 is slowed to a creep speed 316 until a predetermined package portion has been completely discharged 318 and the loss-in-weight feeder 200 has been deactivated 320. I have found that this action is effective as the feeder slows down its discharge rate when the predetermined packaging portion is being approached. As the conveyor rate of speed is being concurrently decreased this coordination of rates will assure a more uniform dispersion of the particulate material along the conveyor so as to preclude material gap therealong. This procedure assures for an effective delivery of the particulate matter to the downstream packaging system. Finally, upon complete discharge at 318 the feeder is deactivated 320 with the conveyor 152 then being signaled 322 to transfer the material thereon to a packaging system 154 at a higher rate of transfer speed to the downstream packaging system 154.

In another embodiment (not shown), the fill/refill operation 302–306 may include a plurality of intermediate weighing and discharge operations using additional bins (shown as intermediate bin 150' in FIG. 10) prior to ultimate discharge into the hopper 210. This multi-stage weighing process delivers a more accurate amount of bulk material to the hopper than a single discharge directly into the hopper 210. The pre-hopper weighing and discharge operations are accomplished at high speeds such that multiple operations can be conducted concurrently with the slower loss-in-weight feeder discharge operation.

Accordingly, it can be seen that the method and apparatus disclosed herein supplies a more accurate portion of bulk material for packaging. A single or multi-stage weighing process is utilized to deliver an amount of bulk material to a loss-in-weight feeder which closely approximates the desired package weight. In addition, springs mounted within the weighing mechanisms allow the loss-in-weight feeder to operate at an improved level of weight variance. It is understood that those skilled in the art can arrive at apparatus to employ the above methodology given the disclosure herein.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A method for accurately dispensing a desired amount of particulate material to a downstream packaging system comprising the steps of:

providing a first upstream bin for initial storage of particulate material;

providing a downstream hopper in communication with said first upstream bin;

discharging a first preselected amount of particulate material from said first upstream bin into said hopper, said first preselected amount approximating a desired amount;

providing a conveyor extending between said first upstream hopper and a downstream packaging system, said conveyor having a transfer speed for delivery of said first preselected amount of material from said hopper to said packaging system;

setting said conveyor to a first speed for particulate discharge thereon, said first speed being less than said transfer speed;

discharging said material in said hopper onto said conveyor at a predetermined discharge rate;

as said amount of discharge from said hopper approaches said desired amount reducing the speed of said conveyor to a second speed below said first speed;

ceasing said discharge from said hopper when said discharge reaches said desired amount; and raising said speed of said conveyor to said transfer speed for downstream delivery to said packaging system.

2. The method as claimed in claim 1 wherein said step of providing a bin comprises the step of providing a plurality of bins containing said particulate material, said discharge of particulate material into said hopper being from said plurality of bins.

3. The method as claimed in claim 1 further comprising the step of providing disc springs for dampening a response of said hopper to a load produced by said second preselected amount of material discharged therein which exceeds a predetermined weight.

4. The method as claimed in claim 2 further comprising the step of providing disc springs for dampening a response of said hopper to a load produced by said second preselected amount of material discharged therein which exceeds a predetermined weight.

5. The method as claimed in claim 1 wherein said preselected amount of particulate material discharged into said hopper is approximately said desired amount.

6. A method for accurately dispensing a desired amount of particulate material to a downstream packaging system comprising the steps of:

providing an upstream storage area for particulate material;

providing a downstream hopper;

providing a bin intermediate said upstream storage area and said downstream hopper;

discharging a first preselected amount of particulate material from said storage area into said bin, said first preselected amount approximating a desired amount;

discharging a second preselected amount of particulate material from said bin into said hopper, said second preselected amount approximating said desired amount;

providing a conveyor extending between said hopper and a downstream packaging system;

setting said conveyor to a first speed;

discharging at a first rate said material in said hopper onto said conveyor;

as said discharge of material from said hopper approaches said desired amount of particulate material, reducing said rate of discharge of material from said hopper onto said conveyor;

reducing said conveyor first speed as said amount of material discharged from said hopper approaches said desired amount;

ceasing said discharge from said hopper upon said discharge from said hopper reaching said desired amount; and raising said speed of said conveyor to said first speed for transfer of said material to a downstream packaging system.

7. The method as claimed in claim 6 wherein said step of providing a storage area comprises the step of providing a plurality of storage areas containing said particulate material, said discharge of particulate material into said hopper being discharged from said plurality of areas.

8. The method as claimed in claim 6 further comprising the step of dampening a response of said hopper to a load produced by said second preselected amount of material therein.

9. The method as claimed in claim 7 further comprising the step of dampening a response of said hopper to a load produced by said second preselected amount of material therein.

10. The method as claimed in claim 6 wherein said preselected amount of particulate material discharged into said hopper is approximately said desired amount.

11. A method for accurately dispensing a desired amount of particulate material to a downstream packaging system comprising the steps of:

providing an upstream storage bin for particulate material;

providing a downstream hopper;

discharging a preselected amount of material from said bin into said hopper in bulk, said preselected amount approximating said desired amount;

dampening a response of said hopper to a load produced by said preselected amount of material therein when said load exceeds a predetermined weight;

providing a conveyor extending between said hopper and a downstream packaging system;

setting said conveyor to a first speed;

discharging said material from said hopper onto said conveyor;

ceasing said discharge from said hopper as said discharge from hopper reaches said desired amount; and transferring by said conveyor said discharged material to a downstream packaging system.

12. The method as claimed in claim 11 wherein said step of providing a bin comprises the step of providing a plurality of bins containing said particulate material, said discharge of particulate material into said hopper being from said plurality of bins.

13. The method as claimed in claim 11 further comprising the steps of:

providing a second upstream storage bin between said upstream storage bin and said hopper, said second upstream storage bin in communication with said upstream storage bin and said hopper;

discharging a first preselected amount of particulate material from said upstream storage bin into said second upstream storage bin, said first preselected amount of particulate material approximating a desired amount; and discharging a second preselected amount of particulate material from said second upstream storage bin into said hopper, said second preselected amount approximating said desired amount.

14. The method as claimed in claim 1, further comprising the steps of:

providing a second upstream storage bin intermediate said first upstream bin and said downstream hopper, said second upstream storage bin in communication with said first upstream storage bin and said hopper;

discharging a first preselected amount of particulate material from said first upstream storage bin into said second upstream storage bin, said first preselected amount of particulate material approximating a desired amount; and discharging a second preselected amount of particulate material from said second upstream storage bin into said hopper, said second preselected amount approximating said desired amount.

* * * * *